(12) United States Patent
Dmitriev et al.

(10) Patent No.: US 6,884,961 B1
(45) Date of Patent: Apr. 26, 2005

(54) INTRAVOLUME DIFFRACTIVE OPTICAL ELEMENTS

(75) Inventors: Vladamir Dmitriev, St. Petersburg (RU); Nikolay Guletsky, St. Petersburg (RU); Sergey Oshemkov, St. Petersburg (RU)

(73) Assignee: UC Laser Ltd., Carmiel (IL)

( * ) Notice: Subject to any disclaimer, the term of this patent is extended or adjusted under 35 U.S.C. 154(b) by 0 days.

(21) Appl. No.: 10/362,800

(22) PCT Filed: Aug. 23, 2001

(86) PCT No.: PCT/IL01/00789

§ 371 (c)(1),
(2), (4) Date: Aug. 15, 2003

(87) PCT Pub. No.: WO02/16969

PCT Pub. Date: Feb. 28, 2002

(30) Foreign Application Priority Data

Aug. 24, 2000 (IL) ................................................ 138011
Dec. 20, 2000 (GB) ........................................... 00311464

(51) Int. Cl.[7] ............................................. B23K 26/00
(52) U.S. Cl. ................................................ 219/121.69
(58) Field of Search ........................ 219/121.6, 121.68, 219/121.69, 121.76, 121.77, 121.85

(56) References Cited

U.S. PATENT DOCUMENTS

| | | | |
|---|---|---|---|
| 3,905,674 A | 9/1975 | Ruell et al. ................... 350/3.5 |
| 4,140,362 A | 2/1979 | Tien .......................... 350/3.72 |
| 4,516,833 A | 5/1985 | Fusek .................... 350/162.12 |
| 4,846,552 A | 7/1989 | Veldkamp et al. ....... 350/162.2 |
| 5,149,938 A | 9/1992 | Winston et al. ........ 219/121.69 |
| 5,157,674 A | 10/1992 | Lawandy ..................... 372/22 |
| 5,253,198 A | 10/1993 | Birge et al. ................. 365/106 |
| 5,289,407 A | 2/1994 | Strickler et al. ............ 365/106 |
| 5,291,317 A | 3/1994 | Newswanger ............... 359/15 |
| 5,325,324 A | 6/1994 | Rentzepis et al. .......... 365/127 |
| 5,410,125 A | 4/1995 | Winston et al. ........ 219/121.69 |
| 5,428,479 A | 6/1995 | Lee ............................. 359/567 |
| 5,450,218 A | 9/1995 | Heanue et al. ................ 359/21 |
| 5,515,183 A | 5/1996 | Hashimoto ..................... 359/9 |
| 5,573,684 A | 11/1996 | Winston et al. ........ 219/121.85 |
| 5,592,313 A | 1/1997 | Hart ............................ 359/24 |
| 5,745,267 A | 4/1998 | Hart ............................ 359/35 |
| 5,761,111 A | 6/1998 | Glezer ........................ 365/106 |
| 5,786,560 A | 7/1998 | Tatah et al. ............ 219/121.77 |
| 5,818,988 A | 10/1998 | Modavis ....................... 385/37 |
| 5,932,119 A | 8/1999 | Kaplan et al. ......... 219/121.68 |
| 6,087,617 A | 7/2000 | Troitski et al. .......... 219/121.6 |
| 6,796,148 B1 * | 9/2004 | Borrelli et al. ............... 65/386 |

FOREIGN PATENT DOCUMENTS

JP 200005112 2/2000
RU 2 008 288 C1 2/1994

OTHER PUBLICATIONS

Denisyuk, "OpticalProperties of an Object as Mirrored in the Wave Field of its Scattered Radiation," published in Optics and Spectroscopy, vol. 15, pp. 522–532

(Continued)

Primary Examiner—Samuel M. Heinrich
(74) Attorney, Agent, or Firm—Sheppard, Mullin, Richter & Hampton LLP

(57) ABSTRACT

A method of producing in a solid transparent material, a diffractive optical element for the transformation of an incident wave in a predefined manner, by developing a mathematical model of the element in terms of the required transformation, then using that model for determining a set of points which form the desired diffractie optical element, and then focusing a pulsed laser beam sequentially onto the points in the set, such that it causes optical breakdown damage at those points. Numerical solutions for determining the positions of the set of points from the mathematical model are presented. The production of number of elements for specific applications is described. Complete laser systems capable of monitoring the production of the points in real time according to the results obtained by diffraction of the incident wave by the element under production.

23 Claims, 6 Drawing Sheets

OTHER PUBLICATIONS

Van Heerden, "Theory of Optical Information Storage in Solids," published in Applied Optics, vol. 2, p. 764, 1963.
B.R. Brown, et al., "Complex Spatial Filtering with Binary Masks," published in Applied Optics, Vo. 5, p. 967, 1966.
B.R. Brown, et al., "Computer–Generated Binary Holograms," IBM J. Res. Develop., pp. 160–168, Mar. 1969.
W.T. Cathey, "The Effect of Finite Sampling in Holography," pp. 317–323, 1968.
J.W. Goodman et al., "Some Effects of Fourier Domain Phase Quantization," published in IBM Journal of Research and Development, vol. 14, p. 478, 1970.
W.H. Lee, "Binary Synthetic Holograms," Applied Optics, vol. 13, No. 7, pp. 1677–1682, Jul. 1974.
P.S. Naidu, "Quantization Noise in Binary Holograms," Optics Communications, vol. 15, No. 3, pp. 361–365, Nov. 1975.
J.P. Allebach, et al., "Aliasing Error in Digital Holography," Applied Optics, vol. 15, No. 9, pp. 2183–2188, Sep. 1976.
J.N. Mait, "Review of Multi–Phase Fourier Grating Design for Array Generation," published in SPIE vol. 1211, p. 67, 1990.
L.D. Faddeev, et al., "Stationary Approach to Scattering Theory," Chapter 2, published by Kluver Dordrech, 1993.
Kazanskly, et al., "Computer–Aided Design of Diffractive Optical Elements," Optical Engineering, Soc. of Optical Instrumentation Engineers, vol. 44, No. 10, pp. 3156–3166, Oct. 1994.
V.A. Soifer, et al., "Multifocal Diffractive Elements," published in Optical Engineering, vol. 33, p. 3610, Nov. 1994.
D. Brown, et al., "Multi–Element Diffractive Optical Designs Using Evolutionary Programming," published in SPIE vol. 2404, p. 17,1995.

* cited by examiner

FIG. 2A
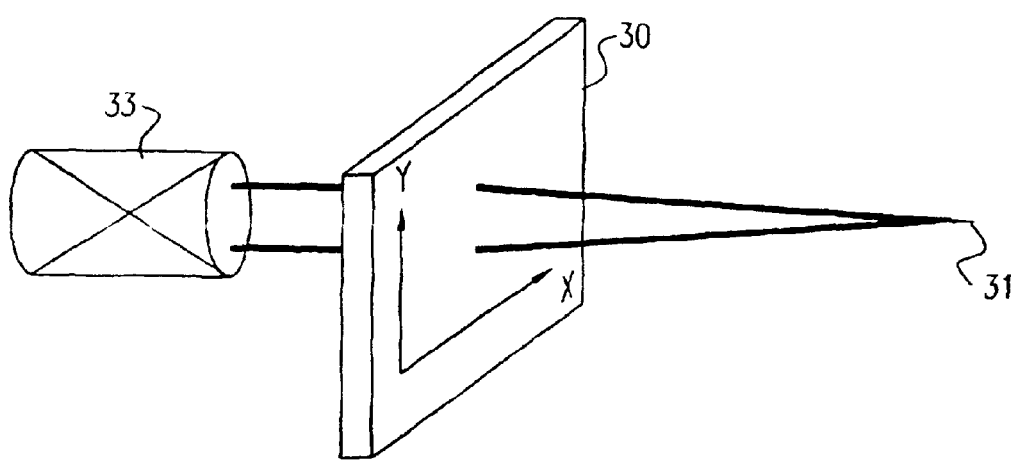
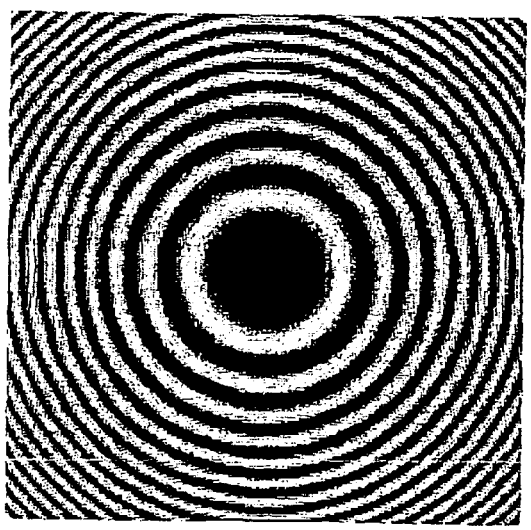
FIG. 2B
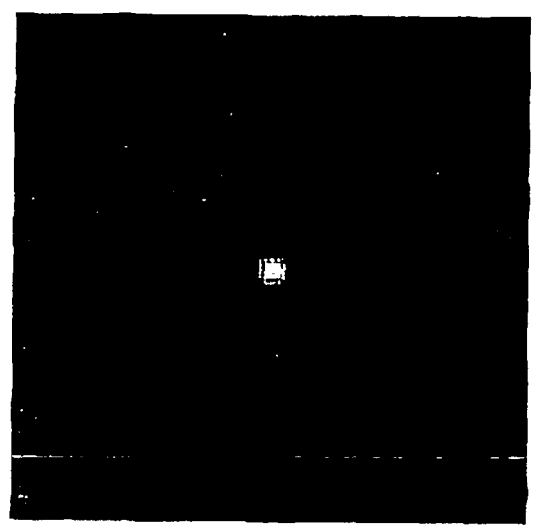
FIG. 2C

FIG. 3A
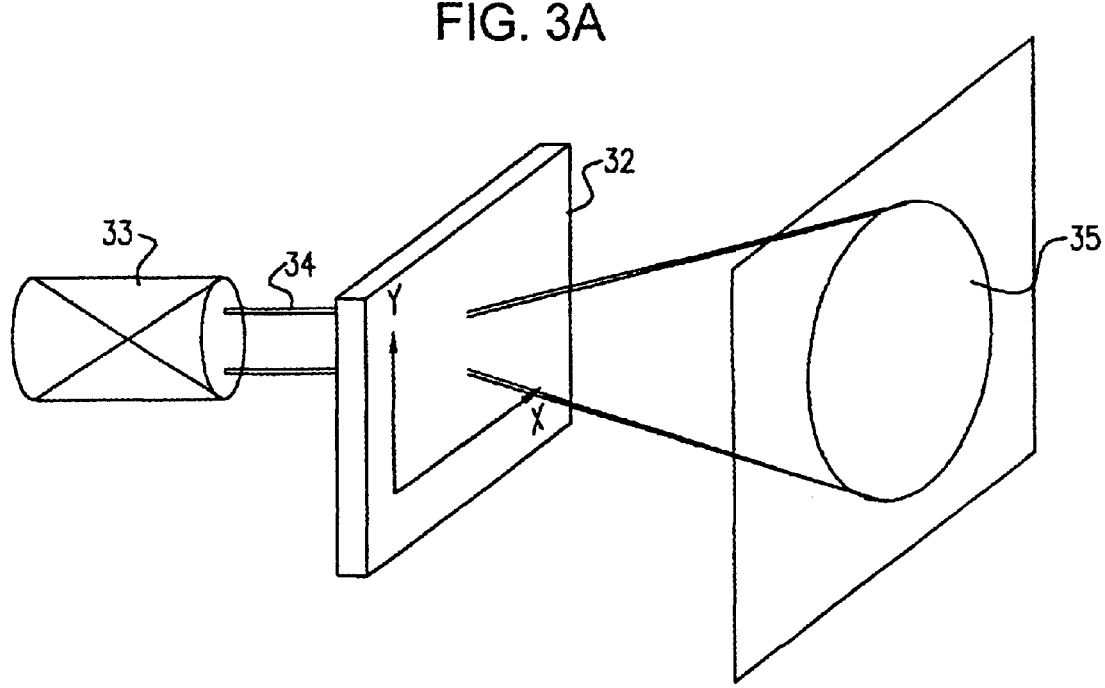
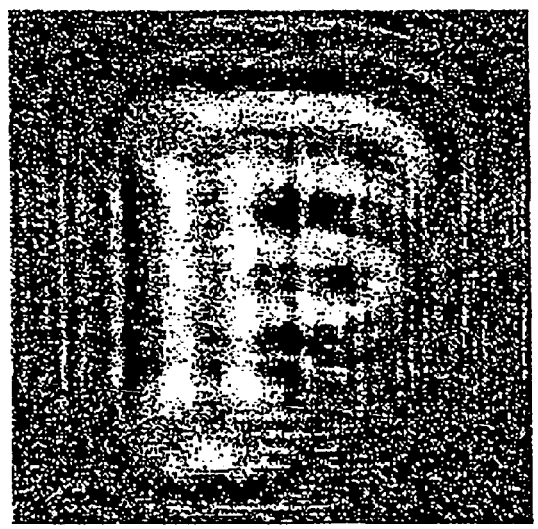
FIG. 3B
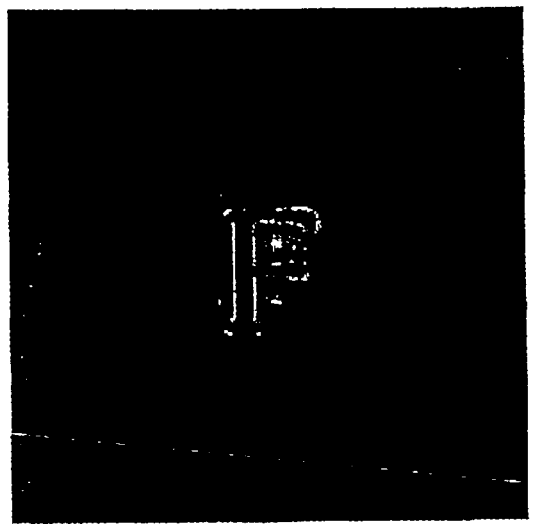
FIG. 3C

INTRAVOLUME DIFFRACTIVE OPTICAL ELEMENTS

FIELD OF THE INVENTION

The present invention relates to the field of intravolume diffractive optical elements, especially those produced in transparent materials by means of digital laser engraving at very high energy densities.

BACKGROUND OF THE INVENTION

Diffractive optical elements (DOE's) are well known and fulfill important roles in industrial and military applications, in imaging, in medicine, in the storage, processing and transmission of information, and elsewhere. Digital DOE's, have been described by B. R. Brown and A. W. Lohmann in the article "Complex Spatial Filtering with Binary Masks", published in Applied Optics, Vol. 5, p. 967ff, (1966). Such digital DOE's have generally been produced by means of mechanical micro-engraving, electron beam, ion beam or chemical etching, electron lithography or photolithography, or by other suitable techniques.

The mathematical functionality of a DOE can be expressed in terms of the field $R(\vec{r})$ produced after imaging by the DOE of an incident light field $S(\vec{u})$. This image field is given by equation 1:

$$R(\vec{r}) = \int_D S(\vec{u})T(\vec{u})\exp(ikd(\vec{r},\vec{u}))/d(\vec{r},\vec{u})ds \qquad (1)$$

where $S(\vec{u})$ is the incident light field at the surface, s, of the DOE, $T(\vec{u})$ is the complex transmission coefficient of the DOE, $d(\vec{r}, \vec{i})$ is the optical path from point $\vec{r}$ to $\vec{u}$ in the imaging space, and $$\int_D$$

is the integral over the surface, s, of the DOE.

Equation (1) is the Kirchhoff approximation for the solution of the scalar Dirichlet problem with infinite boundary conditions, and with Sommerfeld radiation conditions. Equation (1) can alternatively be interpreted as the Fresnel transformation of the field $S(\vec{u})T(\vec{u})$ from the surface of the DOE to the point $\vec{r}$.

In order to construct the desired DOE, the inverse problem has to be solved, whereby the incident field $S(\vec{u})$ and the transmitted field $R(\vec{u})$ are known and the appropriate complex transmission function of the DOE-$T(\vec{u})$, has to be calculated. Such a DOE then produces the desired transformation of the incident field such that the correct field is formed in the image plane. The method of representing the DOE by means of a function $T(\vec{u})$is performed by assigning complex values of the transmission function to discrete pixels of the DOE. The number of pixels chosen depends on the size of the DOE and its resolution. The values of the transmission function for each pixel can be calculated by means of scalar diffraction theory, and form a Fourier transform of the model field. Evaluation of this Fourier series requires some approximations. Several numerical methods and procedures for the calculation of DOE's, both direct and indirect, have been proposed in the prior art. Examples of such methods are given, for instance by D. Brown and A. Kathman, in the article "Multi-element diffractive optical designs using evolutionary programming" published in SPIE Vol. 2404, p.17ff, 1995; by J. N. Mait, in "Review of multi-phase Fourier grating design for array generation", published in SPIE Vol. 1211, p. 67ff, 1990; by V. A. Soifer, et al., in "Multifocal diffractive elements", published in Optical Engineering, Vol. 33, p. 3610ff, November 1994; and by N. L. Kazansky and V. V. Kotlyar, in "Computer-aided design of diffractive optical elements", published in Optical Engineering, Vol. 33, p. 3156ff, (October 1994). These different methods are intended for different types of DOE and field transformations. A review of the problems associated with these methods, and various discretization quantization and errors are discussed in "Some effects of Fourier domain phase quantization" by J. W. Goodman and A. M. Silvestri, published in IBM Journal of Research and Development, Vol. 14, p. 478ff, (1970) and in "Aliasing errors in digital holography" by J. Buklew and N. C. Galaher, published in Journal of Applied Optics Vol. 15, p. 2183ff, (1976).

A major drawback of the prior art conventional methods of producing computer-generated DOE's is that they are principally two dimensional in nature and are located on the surface of the DOE. Such DOE's have found limited use because of the complexity of constructing integrated multi-element devices from an assembly of 2-dimensional devices. The need to maintain correct alignment of a number of separate elements, also reduces the reliability of such a device. A further serious limitation is the inability to produce a coherent arrangement of independent sequential devices and a 3-dimensional spatial diffractive structure. These problems are analogous to the differences found in the prior art between conventional 2-D Gabor holograms and 3-D Lipman-Denisyuk holograms, as described by Denisyuk in the article "Optical Properties of an Object as Mirrored in the Wave Field of its Scattered Radiation", published in Optics and Spectroscopy, Vol. 15, pp. 522–532, (1963). This difference is analyzed by Van Heerden in the article "Theory of optical information storage in solids", published in Applied Optics, Vol. 2, pp.764ff, (1963).

A number of different types of DOE's, produced according to prior art methods and apparatus, are described in the following documents: U.S. Pat. No. 5,291,317, to Newswanger et al, describes methods and apparatus for creating a plurality of holographic diffraction grating patterns in a raster scan fashion; U.S. Pat. No. 3,905,674, to Ruell et al, describes apparatus for producing one-dimensional holograms; U.S. Pat. No. 4,140,362, to Tien et al, describes a method for forming focusing diffraction gratings by production of a predetermined interference pattern on photosensitive film; U.S. Pat. No. 4,516,833, to R. L. Fusek describes the production of high performance optical spatial filters; U.S. Pat. No. 4,846,552, to W. B. Veldkamp et al, describes a method of fabricating high efficiency binary planar optical elements based on photolithographic techniques; U.S. Pat. No. 5,428,479, to R. A. Lee describes a method of manufacture of a diffraction grating with assembled point gratings; and U.S. Pat. No. 5,818,988 to R. A. Modavis describes a method of forming a grating in an optical waveguide utilizing photosensitive materials. All of the above-cited prior art methods have one or more of the disadvantages mentioned in the previous paragraph.

Furthermore, in U.S. Pat. No. 5,761,111 to E. N. Glezer, are described methods of providing 2- or 3 dimensional optical information storage in transparent materials by controllably focusing ultra-short laser pulses into a transparent medium. Volume DOE's are mentioned therein as one of the applications for the method. However, no details are provided, nor are any methods suggested of how to calculate the necessary "information" for storage in the transparent medium to produce such a DOE.

There therefore exists a serious need for a method of constructing intravolume multi-element DOE's, which overcome disadvantages of prior art DOE's.

All of the documents mentioned in this section, and in the other sections of this specification, are hereby incorporated by reference, each in its entirety.

SUMMARY OF THE INVENTION

The present invention seeks to provide a new method of producing 3-dimensional intravolume DOE's, including both polychromatic and achromatic DOE's, in transparent materials, by creating inside the material a set of scattering centers. The position of every point of this set of scattering centers is computed, so that the set of secondary waves of light scattered from these points is such as to create the desired field by means of a suitable transformation of the incident electromagnetic field. Unfortunately, no accurate mathematical techniques exist for calculation of such an accumulated scattered secondary wave. The methods described in the above-mentioned references can be applied only to two dimensional structures or to an incoherent set of two-dimensional devices.

In the zero level approximation, the resulting scattered wave from such a set of points can be written as:

$$R(\vec{r}) = \sum_{i=1}^{i \leq I} S(\vec{u}_i) a_i(\vec{r}) \exp(ikd(\vec{r}, \vec{u}_i)) / d(\vec{r}, \vec{u}_i) \quad (2)$$

where i is used to enumerate the scattering centers from 1 to I, $\vec{u}_i$ is the position of i th center, and $a_i(\vec{r}_j)$ is the complex scattering coefficient of the i th center in direction $\vec{r}_j$.

The other variables have the same meaning as in equation (1).

Equation 2 is the analog of equation 1 for the 3-dimensional discrete case, but it is only a zero level approximation. Equation 2 can be evaluated in an analytical form, but an analytic solution of the inverse problem of finding $a_i(\vec{r}_j)$ when $R(\vec{r}_j)$ and $S(\vec{u}_i)$ are given cannot be achieved. The inverse problem can, however, be converted to one of functional extremum searching:

$$I, \vec{u}_i, a_i(\vec{r}_j) \geq \quad (3)$$

$$\min \left\{ \sum_{j=1}^{j \leq J} \left( D(\vec{r}_j) - \sum_{i=1}^{i \leq I} S(\vec{u}_i) a_i(\vec{r}_j) \exp(ikd(\vec{r}_j, \vec{u}_i)) // d(\vec{r}_j, \vec{u}_i) \right)^2 \right\}$$

where $\vec{r}_j, j=1 \ldots J$ are reference points, and $D(\vec{r}_j)$ is the desired resulting field.

A solution of equation (3) for the value of $a_i(\vec{r}_j)$ can be obtained both for fixed positions of the scattering centers and for a discrete set of real scattering coefficients. The solution of this problem for a fixed set of scattering centers at $\vec{u}_i$ can be performed by means of a number of well known methods. One example is by the use of the modified genetic algorithm, as discussed in "Multi-element diffractive optical designs using evolutionary programming", by D. Brown and A. Kathman, published in SPIE, Vol. 2404, pp.17–27, (1995), hereby incorporated in its entirety by reference.

Simplifying assumptions can be made for specific geometrical applications.

Thus, for instance, if the DOE is to be used in an application with a spherical incident wavefront, then the set of scattering points may be limited to points located on a spherical shell. In such a situation, the configuration becomes a scalar scattering problem, since the E-field vector of the incident field is always perpendicular to the scattering plane. This then enables the same result to be achieved as that obtained using a DOE having scattering points arranged in the entire volume of the sample, but with fewer scattering points.

A more accurate mathematical model of a three-dimensional discrete DOE can be obtained using an analog to Faddeev's approach of T-matrix formalism for a multi-body system, as described in L. D. Faddeev and S. P. Merkuriev, "Quantum Scattering Theory for Several Particle Systems", published by Kluver, Dordrech, 1993.

The stationary wave equation in a solid medium is expressed as:

$$(-\Delta_x - k^2) \Psi_0(\vec{x}, \vec{k}) = 0 \quad (4)$$

where $\Psi_0(\vec{x}, \vec{k})$ is a solution of the wave equation for a specific wave vector $\vec{k}, k = |\vec{k}|$ and $\Delta_x$ is the Laplace operator in x space.

For a domain $\Omega$ of scattering centers, equation (4) can be written as:

$$(-\Delta_x - k^2 c_0^2 / c_1^2(\vec{x}, \vec{k})) = 0 \quad (4a)$$

where $c_0$ is the velocity of wave propagation in the given media, $c_1(\vec{x})$ is the velocity of wave propagation in the domain $\Omega$ of scattering centers.

Equations (4) and (4a) can be combined into one equation:

$$(-\Delta_x - k^2 + w(k^2, \vec{x})) \Psi(\vec{x}, \vec{k}) = 0 \quad (5)$$

where the following notations have been introduced:

$$w(k^2, \vec{x}) = k^2 (1 - c_0^2 / c_1^2(\vec{x})) \Rightarrow w(k^2, \vec{x}) = 0, \vec{x} \notin \Omega$$

With regard to the radiation conditions for a scattering center located at the origin, an asymptotic solution of (5) is assumed, as follows:

$$\psi(\overline{x}, k, \overline{k}) \approx \exp\{ik(\overline{x}, \overline{k})\} + a(\overline{x}, \overline{k}, k) \frac{\exp\{ikx\}}{x} \quad (6)$$

where $\vec{x} = \vec{x}/x$, $\vec{k} = \vec{k}/k$, and $a(\vec{x}, \vec{k}, k)$ is the scattering amplitude.

Defining a Green's function:

$$g_0(z) = (-\Delta_x - z)^{-1}$$

$$g(z) = (-\Delta_x - z + w(z, \vec{x}))^{-1}.$$

The perturbed Green's function can then be represented as:

$$g(z) = g_0(z) - g_0(z) t(z) g_0(z) \quad (7)$$

t(z) is called the T matrix and obeys the integral equation:

$$t(z) = w(z,.) - w(z,.) g_0(z) t(z) \quad (8)$$

This is equivalent to the equation for the kernels of the Fourier transformation of participating operators:

$$t(\vec{p}, \vec{p}', z) = w(z, \vec{p} - \vec{p}') - \int d\vec{p}'' w(z, \vec{p} - \vec{p}'')(p''^2 - z)^{-1} t(\vec{p}'', \vec{p}', z) \quad (8a)$$

General scattering theory gives the basic relation between the solution of (5), the scattering amplitude in (6) and the T-matrix $$a(\vec{x}, \vec{k}, k) = i2\pi t(k\vec{x}, k\vec{k}, k^2 + iO) \quad (9)$$

$$\psi(\vec{x}, \vec{k}) = \lim_{\varepsilon \to 0} - i\varepsilon g(k^2 + i\varepsilon)\psi_0(\vec{x}, \vec{k})$$

The wave equation for a set of scattering centers reads:

$$(-\Delta_x - k^2 + W(k^2, \vec{x}))\Psi(\vec{x}, \vec{k}) = 0 \quad (10)$$

The perturbation $W(k^2, \vec{x})$ is a summation over all scattering centers of the local perturbations $$W(k^2, \vec{x}) = \sum_i w_i(k^2, \vec{x}).$$

The T matrix for (10) obeys the following equation:

$$T(z) = W(k^2, z) - W(k^2, z)g_0(z)T(z) \quad (11)$$

Defining the components of the T matrix as:

$$T_i(z) = w(z, .-u_i) - w(z, .-u_i)g_0(z)T(z), \; T(z) = \sum_i T_i(z) \quad (12)$$

After transformation, equation (12) gives:

$$T_i(z) = t_i(z) - t_i(z)q_0(z)\sum_{j \neq i} T_j(z) \quad (13)$$

Here T matrix $t_j(z)$ for the j-th scattering center has been introduced:

A solution of (13) can be presented as a series:

$$T_i(z) = t_i(z) - t_i(z)g_0(z)\sum_{j \neq i} t_j(z) + \quad (14)$$

$$t_i(z)g_0(z)\sum_{j=i} t_i(z)g_0(z)\sum_{k=j} t_k(z) - \ldots$$

$$T(z) = \sum_{l=0}^{\infty} \Theta^l(z)t(z),$$

where $\Theta(z)$ is an operator matrix with components $\Theta_{ij} = t_i(z)g_0(z)(\delta_{ij} - 1)$, and $T(z)$ and $t(z)$ are vectors with components $T_i(z)$ and $t_i(z)$ respectively.

In most cases, this is a convergent series and it has a clear physical meaning of sequential one fold, twofold and . . . scattering.

The total resulting scattering amplitude $A(\vec{x}, \vec{k}, k)$ according to (9) can be presented as:

$$A(\vec{x}, \vec{k}, k) = -12\pi T(k\vec{x}, k\vec{k}, k^2 + iO)$$

In the zero level approximation, $$T(z) = \sum_i T_i(z) = \sum_i t_i(z),$$

after averaging over the wave vector of the incident field, a result similar to (2) is obtained with $$a_i(\vec{r}_j) = \int d\vec{k}\, a_i(\vec{r}_j, \vec{r}, \vec{k}, k).$$

The use of series (14) allows obtaining the correct problem definition for manifold scattering. The great advantage of equation (3) is the possibility of sequential evaluation of the extremum according to the level of approximation, or in the present case, to the degree of operator $\Theta(z)$. On the other hand, equation (9) allows another interpretation of Green's function $G(k^2)$ as a propagation operator for the wave function and the solution $\Psi(\vec{x}, \vec{k})$ as a result of transformation of the incident field $\Psi_0(\vec{x}, \vec{k})$.

Denoting this transformation as $G(a_0 \vec{u}_0, a_1 \vec{u}_1, a_2 \vec{u}_2, a_3 \vec{u}_3, \ldots a_i \vec{u}_i)$.

It should be emphasized that this transformation depends on scattering properties of $i^{th}$ center $a_i$ and it's location $\vec{u}_i$. Hence the problem expressed in (3) becomes:

$$\Psi(\vec{x}, \vec{k}) = G(a_0 \vec{u}_0, a_1 \vec{u}_1, a_2 \vec{u}_2, a_3 \vec{u}_3, \ldots a_i \vec{u}_i)\Psi_0(\vec{x}, \vec{k}) = G(\{a_1 \vec{u}_1\})\Psi_0(\vec{x}, \vec{k})$$

$$I, \bar{u}_i, a_i \Rightarrow \min\left\{\sum_{j=1}^{j \leq J}(D(\bar{r}_j) - (G(\{a_i \bar{u}_i\})S)(\bar{r}_j))^2\right\} \quad (15)$$

There is thus provided, in accordance with a preferred embodiment of the present invention, a method of producing a 3-dimensional DOE, using the phenomenon of intavolume optical breakdown. Intravolume optical breakdown involves the focusing of the beam from a laser emitting ultra-short pulses, of the order of tens of picoseconds or less, into the volume of a transparent material, by means of a high quality objective lens, such that a focal spot of size close to the diffraction limit for the laser wavelength, is obtained within the material. At very high power densities, of the order of $10^{13}$ Watts/cm$^2$, the material undergoes optical breakdown, since the power density of the focused beam far exceeds the threshold above which nonlinear effects occur in the transmission properties of the otherwise transparent materials, and the material strongly absorbs the focused beam. Because of the intense power density, atomic and molecular bonds of the material are broken down, and the material decomposes almost instantaneously into its basic components, generally highly ionized component atoms, leaving behind a tiny diffuse scattering center. The optical breakdown damage zones constituting these scattering centers define the pixels of the DOE. The position of these scattering centers is calculated according to the function of the DOE planned, using one of the methods described hereinabove, such as by the modified genetic algorithm. The production of such optical breakdown damage centers has been described in Russian Patent No. RU 2,008,288 to S. V. Oshemkov, one of the current applicants, entitled "Process for Laser Forming of Images in Solid Media". This document is hereby incorporated by reference in its entirety.

Alternatively and preferably, the DOE may be produced in a transparent molecularly porous material, such as Corning Glass type Porous Vicor 7930, and the voids created at the optical breakdown damage zones filled with a liquid having a different refractive index to that of the transparent material for instance by immersion in the liquid. The scattering then takes place from those points of different refractive index. The liquids used can preferably be organic solvents such as acetone, alcohol or toluene, or other suitable liquids such as oils, having suitably different refractive index from the host material. A sealant layer is preferably applied to the DOE so produced in order to avoid loss of the filling liquid.

According to further preferred embodiments of liquid filled DOE's, the liquid used can act as a carrier of another active material, such as a phosphorescent or a fluorescent dye, or a simple absorbent dye, and the DOE operative by scattering from this dye under the relevant conditions of activation or view. Details of the production of such fluid-filled voids are described in the co-pending PCT Patent Application No. PCT/RU 98/00241 entitled "Method for Forming Images" to one of the inventors of the present application. The published Application is herewith incorporated by reference in its entirety.

It should be noted that use of the term transparent throughout this specification is taken to refer to the transparency of the material at the processing laser wavelength, and it is thus quite feasible for a DOE to be produced, according to the present invention, in materials which are opaque at visible wavelengths.

The above method is capable of producing pixels of size close to the diffraction limit for the laser light used, of the order of 0.5 $\mu$m, and at distances apart of less then 1 $\mu$m. In order to produce a periodic diffraction grating of period $\Delta$, the maximum diffraction angle, $\alpha$, is defined by the equation $k\Delta\sin(\alpha)=2\pi$. This means that the diffraction angle, even for a plane DOE, may be greater than 60 degrees.

There is thus provided, in accordance with another preferred embodiment of the present invention, a method for producing a computer generated, intravolume diffractive optical element in a transparent material by means of the controlled production of scattering centers by means of optical breakdown in the material, resulting from the focusing of high intensity laser pulses therein. Since they are computer generated, such DOE's are called digital DOE's. In the case where the scattering points essentially consist of a series of digital ones or zeros, in so far as their scattering ability is concerned, such DOE's are also known as binary DOE's. For binary DOE's equation (14) allows some simplifications to be made. Every scattering center can be assumed to have the same perturbation operator:

$$w_i(k^2, \vec{x}) = w(k^2, \vec{x} - \vec{u}_i),$$

which is shifted to a location of the center $\vec{u}_i$.

Hence according to equation (6), $t_j(\vec{k}, \vec{k}', z) = t(\vec{k}, \vec{k}', z)\exp\{i(\vec{u}_j, \vec{k} - \vec{k}')\}$.

The last expression obviously gives Bragg's scattering condition for a periodic grid of scattering centers.

The accuracy of the arrangement of pixels inside the transparent material depends on the quality of the optical and mechanical beam positioning system, and on the size of the pixels produced. In practice, with good quality focusing optics, it is possible to create pixels of size close to $\lambda/2$ of the engraving light, which is the theoretical limit for such a focusing process, and with a location accuracy of greater than $\lambda/8$. Pixel sizes and location accuracies of this order should thus be sufficient for the production of intravolume DOE's for use in the visible range, by means of the methods of this invention.

The DOE's constructed according to the present invention can be used for a number of purposes in the field of optics, including, but not limited to, focusing, beam shaping, wavefront correction, beam splitting, optical filtering, diffracting, partial reflecting, and others. According to a further preferred embodiment of the invention, if the scattering points are produced throughout the volume of the transparent material in a random manner, an optical diffuser is obtained, whose density is dependent on the density of scattering centers produced.

Most of the known prior art DOE's are monochromatic and are designed for one specific wavelength. DOE's constructed according to preferred embodiments of the present invention are primarily three dimensional, and this enables the selection of a wide range of spatial wave vectors for achieving polychromatic design. This means that it is possible to control the scattering of a set of electromagnetic waves with different wavelengths. This feature allows achromatic DOE's to be achieved, when the element is designed such that all the waves with different wavelength are scattered in the same way.

In addition to correcting the imaging functions of light beams, DOE's according to other embodiments of the present invention, can be utilized for transformation of an incident electromagnetic field in a predetermined manner. It is thus possible to compensate a beam emitted from a light source, such as, for instance, a laser diode, or a LED, for undesired properties therein. In this application, the light emitted from the source is measured, and the results analyzed and compared with the desired output of the source. A set of data according to the differences between the measured and desired beam characteristics is used to produce a DOE according to preferred methods of the present invention. When this DOE is incorporated into the front envelope of the source, or elsewhere in its beam path, it compensates the emitted light to achieve the desired beam characteristic. Depending on the type of incident wave analysis performed, correction can be achieved for undesired characteristics in spatial intensity (mode form), phase or even chromatic variations of the beam. Thus, for spatial intensity corrections, a simple beam profile is sufficient, for phase correction, a fill phase profile of the incident beam is necessary, and for chromatic correction, a wavelength profile is preferably used. The correcting DOE is calculated according to the differences between the undesired beam characteristics and the desired beam characteristics.

Since the DOE's constructed according to the present invention are intravolume elements, using all three dimensions of the support material, they are well suited for multielement designs, since all the elements can be located in one piece of glass, and do not need any adjustment or maintenance. Such a multi-element device can also be constructed by locating the scattering points in a plurality of separate planes, thus constituting a sequential set of diffractive elements. Furthermore, the DOE's constructed according to the present invention can be used in hybrid optical assemblies by locating them inside the volume of classic refractive elements constituting a hybrid optical device.

In accordance with yet another preferred embodiment of the present invention, there is provided a method of producing in a solid transparent material, a diffractive optical element for the predefined transformation of an incident wave, consisting of the steps of developing a mathematical model of the diffractive optical element in teens of the transformation, using the mathematical model for determining a set of points which form the diffractive optical element, and focusing at least one pulsed laser beam onto the points, such that it causes optical breakdown damage at the points.

In accordance with yet another preferred embodiment of the present invention the mathematical model may review the discrete structure of the set of points and take into account the amplitude and phase properties of their scattering diagram.

In accordance with still another preferred embodiment of the present invention, there is provided in the method described above, the determining is performed by finding a numerical solution to the equation $$I, \bar{u}_i, a_i \Rightarrow \min\left\{\sum_{j=1}^{i\leq J}(D(\bar{r}_j) - (G(\{a_i\bar{u}_i\})S)(\bar{r}_j))^2\right\}$$

where the symbols have the meaning used in the above-mentioned disclosure. The numerical solution may be found by use of a modified genetic algorithm.

There is further provided in accordance with still another preferred embodiment of the present invention, a method as described above, and wherein the set of points is determined by taking into account twofold or multifold scattering of the scattered wave by the set of points.

In accordance with a further preferred embodiment of the present invention, there is also provided a method as described above, wherein the solid transparent material is a porous material, and wherein the points of the optical breakdown damage may be filled with a liquid having a refraction index different from that of the transparent material.

There is also provided in accordance with yet further preferred embodiments of the present invention, any of the methods described above, and wherein the set of points lies on a curved two-dimensional surface, or consists of a plurality of planes which form a sequential set of diffractive elements, or are located in substantially any location in the three dimensional volume of the material, or form a binary diffractive optical element.

In accordance with yet another preferred embodiment of the present invention, there is provided a method as described above, and wherein the points are located on a fixed grid, have sizes determined from a definite set and form a digital diffractive optical element. The sizes may be variable and are achieved by varying the number of pulses of the pulsed laser beam used to form each point.

There is further provided in accordance with yet another preferred embodiment of the present invention, a method as described above, and wherein the step of developing a mathematical model is performed by analysis of the incident wave.

In accordance with still another preferred embodiment of the present invention, the diffractive optical element may be operative to compensate for undesired properties of the incident wave.

There is further provided in accordance with still another preferred embodiment of the present invention, a method as described above, and wherein the step of developing a mathematical model is performed during production of the diffractive optical element, by analysis of the scattered wave.

In accordance with a further preferred embodiment of the present invention, there is also provided a method as described above, and also consisting of the step of impinging a monitoring incident wave onto the diffractive optical element during at least part of the step of focusing a pulsed laser beam onto each of the points sequentially, and correcting the diffractive optical element during production in accordance with the scattered wave obtained in real time.

In accordance with yet a further preferred embodiment of the present invention, any of the methods described above may be used to correct an aberration in an optical element by the formation of a diffractive optical element within the element. In accordance with another preferred embodiment of the present invention, a monitoring incident wave is impinged onto the optical element during at least part of the step of focusing a pulsed laser beam onto each of the points sequentially, and the diffractive optical element corrected during production in accordance with aberrations obtained from the optical element in real time.

In accordance with more preferred embodiments of the present invention, the diffractive optical element may be a wave front corrector, or a lens, or a grating, or a beam splitter or a filter, or has a predefined reflectance to the incident wave, or is an optical diffuser.

Furthermore, in accordance with vet another preferred embodiment of the present invention, there is provided a method as described above, and wherein the laser beam is focused onto the points sequentially by mutual motion of the laser beam and the solid transparent material.

There is also provided in accordance with further preferred embodiments of the present invention, a method wherein the laser beam is focused onto a plurality of the points simultaneously by transmitting the beam through a master diffractive optical element operative to focus the beam onto the plurality of points.

In accordance with yet another preferred embodiment of the present invention, the at least one laser beam may be a plurality of laser beams, operative to simultaneously produce a plurality of diffractive optical elements.

There is even further provided in accordance with a preferred embodiment of the present invention, a laser system for simultaneous production of a plurality of damage points in a solid transparent material, consisting of a pulsed laser beam capable, when focused, of causing optical breakdown damage at the points in the material, and a master diffractive optical element, through which the pulsed laser beam is passed, the master diffractive optical element being predefined such as to focus the laser beam onto the locations of the plurality of damage points. Furthermore, in accordance with yet more preferred embodiments of the present invention, the laser system can further include a computer control system for relative displacement of the sample and the laser beam, and can further include a focusing optical system.

There is also provided in accordance with a further preferred embodiment of the present invention, a laser system for producing a diffractive optical element in a solid transparent material consisting of a pulsed first laser beam capable, when focused, of causing optical breakdown damage at points in the material an optical system for focusing the first laser beam, a computer controlled motion system for moving the solid transparent material in the first laser beam, such that the optical breakdown damage is formed at the desired points, a second laser beam, projected through the solid transparent material operative as a probing beam, and an imaging system consisting of a camera for monitoring the diffraction of the second laser beam through the diffractive optical element, the imaging system providing data to the computer controlled motion system, such that the diffractive optical element is correctly formed in real time according to the diffractive effects obtained.

BRIEF DESCRIPTION OF THE DRAWINGS

The present invention will be understood and appreciated more fully from the following detailed description, taken in conjunction with the drawings in which:

FIG. 2(a) is a schematic illustration of the use of a DOE, constructed and operative according to a preferred embodiment of the present invention, for beam focusing; FIG. 2(b) shows a typical DOE pixel arrangement for performing the focusing functions shown in FIG. 2(a); and FIG. 2(c) is a view of the logarithm of the energy distribution of the resulting field in the focal plane;

FIG. 3(a) is a schematic illustration of the use of a DOE, constructed and operative according to a preferred embodiment of the present invention, for beam shaping; FIG. 3(b) shows a typical example of a DOE pixel arrangement for performing the shaping functions shown in FIG. 3(a); and FIG. 3(c) is a view of the energy distribution of the resulting field in the object plane;

DETAILED DESCRIPTION OF PREFERRED EMBODIMENTS

Figure 1:
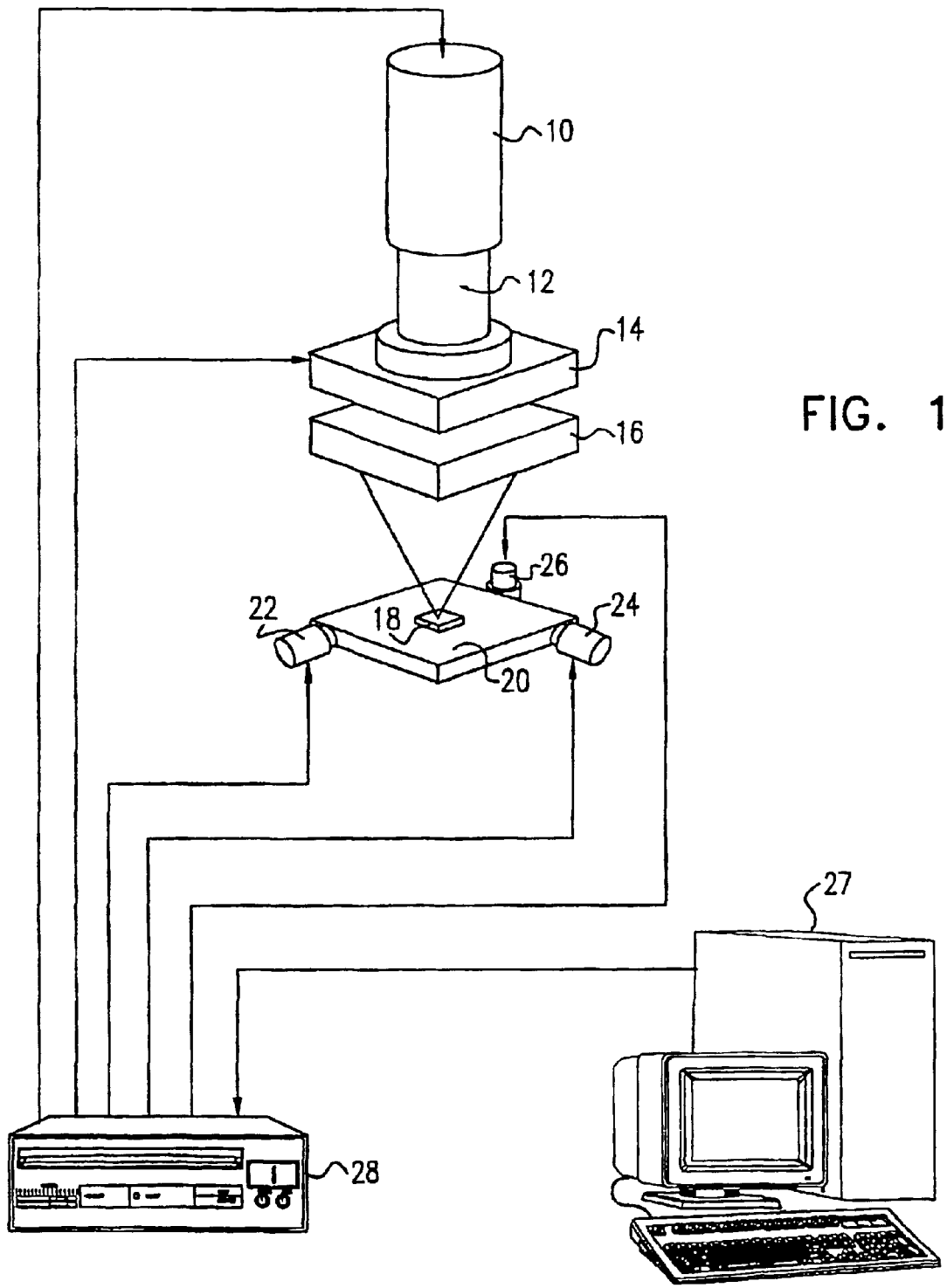
FIG. 1 is a schematic illustration of a computer controlled system for the production of computer generated intravolume 3-dimensional DOE's, constructed and operative according to a preferred embodiment of the present invention.

Reference is now made to FIG. 1, which illustrates schematically a computer-controlled system for the production of 3-dimensional intravolume Diffractive Optical Elements, constructed and operative according to a preferred embodiment of the present invention. A femtosecond pulsed laser 10 emits a beam 12 which is deflected by beam deflector 14 and focused by means of a high quality optical system 16, into a transparent sample 18 in which the DOE is to be produced. The laser pulse peak power is sufficiently high to achieve optical breakdown for the particular material of the sample.

The sample is disposed on a CNC-controlled three-axis precision stage 20. The motions along the X-Y-Z axes are executed by means of motors 22, 24, 26. Selection of the position at which the spot is to be focused is performed either by motion of the sample using the CNC-controlled motion stage 20, or by means of a the fast optical beam scanner 14, which operates in the x-y plane only, or by a combination of both. A computer 27, supplies data to a CNC controller unit 28, which supervises all of the functions of the system, synchronizing the firing of the laser pulses with the motion of the X-Y-Z stage and deflector, such that the required arrangement of scattering points is formed throughout the volume of the sample, in accordance with a predefined program. The method by which the predefined program determines the location of each scattering center is described hereinabove.

Reference is now made to FIG. 2(a), which schematically illustrates the use of a DOE 30, constructed and operative according to a preferred embodiment of the present invention, in a beam focusing application. The beam from the laser 33 is focused at the point 31. FIG. 2(b) is a typical DOE pixel arrangement for performing the focusing function shown in FIG. 2(a). FIG. 2(c) is a view of the logarithm of the energy distribution of the resulting field in the focal plane. This beam focusing element resembles a Fresnel Zone plate, but is constructed from scattering points. It differs from a Zone plate due to the phase properties of the T-matrix (i.e. scattering amplitude equation (9)$A(\vec{x},k,\vec{k})$).

Reference is now made to FIG. 3(a), which is a schematic illustration of the use for beam shaping of a DOE 32, constructed and operative according to another preferred embodiment of the present invention. The laser 33 produces a plane coherent wavefront 34, which is directed to be incident on the DOE 32. The arrangement of scattering centers produced by the methods of the present invention within the volume of the DOE, are such as to cause the plane wave 34 to diverge to produce the desired high contrast image 35 in the image plane. FIG. 3(b) shows a typical example of a DOE pixel arrangement for performing the shaping functions shown in FIG. 3(a). FIG. 3(c) is a view of the energy distribution of the resulting field in the object plane. Such a DOE can be used in encoding, encryption or marking applications.

Figure 4A:
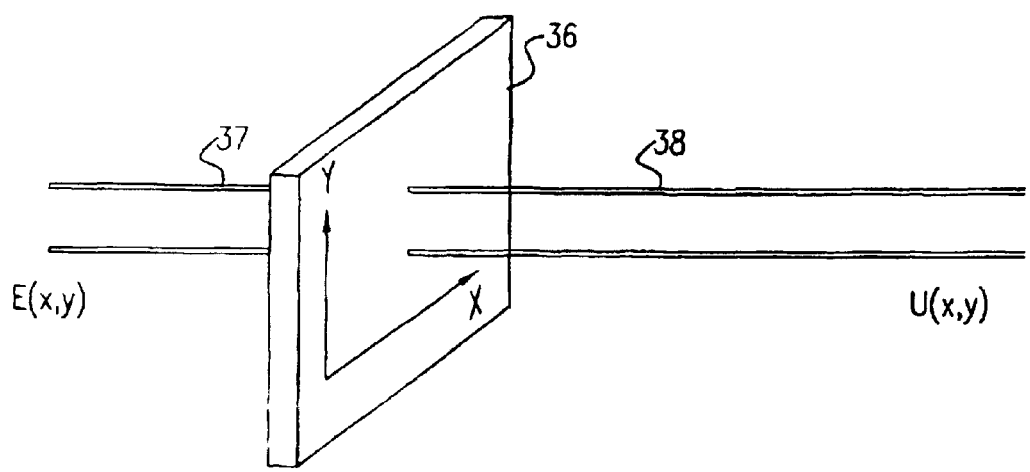
FIG. 4(a) is a schematic illustration of using a DOE, constructed and operative according to a preferred embodiment of the present invention, as a wave front corrector.

Reference is now made to FIG. 4(a), which is a schematic illustration of the use of a DOE 36, constructed and operative according to a preferred embodiment of the present invention, as a wave front corrector. The DOE operates by preferentially spatially diffracting the incident beam 37 in such a way that the incident field E(x,y) is refracted to a value U(x,y) for every point in the transmitted beam 38.

Figure 4B:
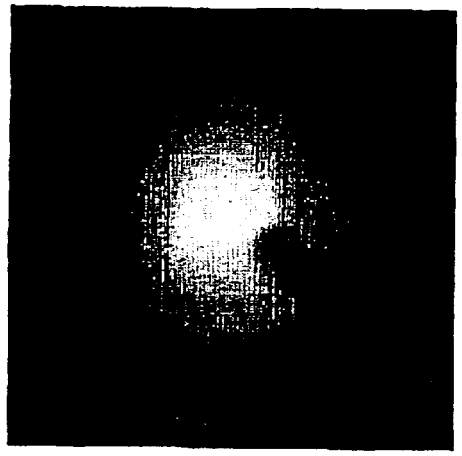
FIG. 4(b) is an illustration of the known energy distribution in the incident field, which may have aberrations which it is desired to remove.
Figure 4C:
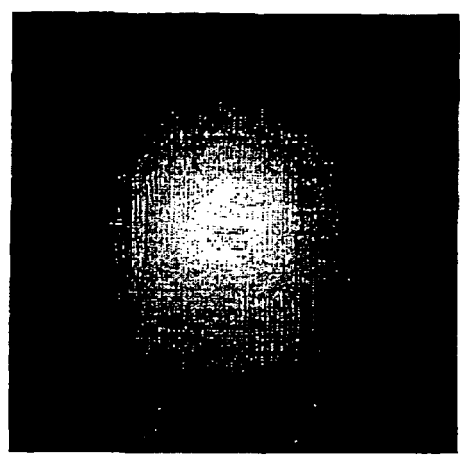
FIG. 4(c) shows the desired energy distribution.
Figure 4D:
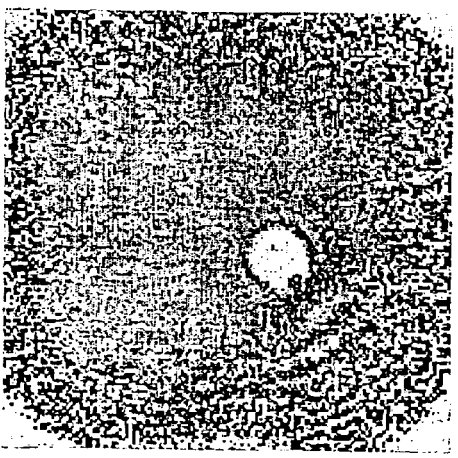
FIG. 4(d) shows a sample of a DOE pixel arrangement.
Figure 4E:
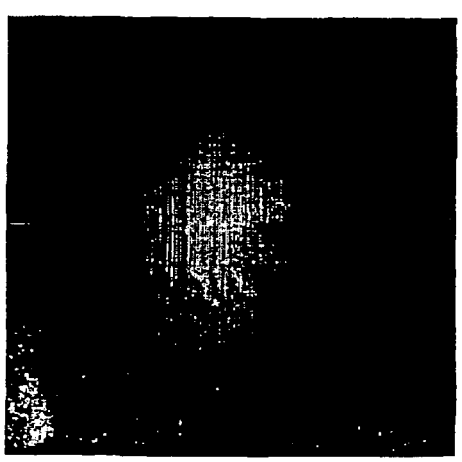
FIG. 4(e) illustrates the energy distribution obtained in the refracted field.

FIG. 4(b) is an illustration of the known energy distribution in the incident field, which may have aberrations which it is desired to remove. FIG. 4(c) shows the desired energy distribution. FIG. 4(d) shows a sample of a DOE pixel arrangement. FIG. 4(e) illustrates the energy distribution obtained in the refracted field after passage through the field-correcting DOE. Such an aberration-correcting DOE may also be produced inside another optical element, whether conventional or a DOE, in order to correct aberrations present in that optical element.

Figure 5:
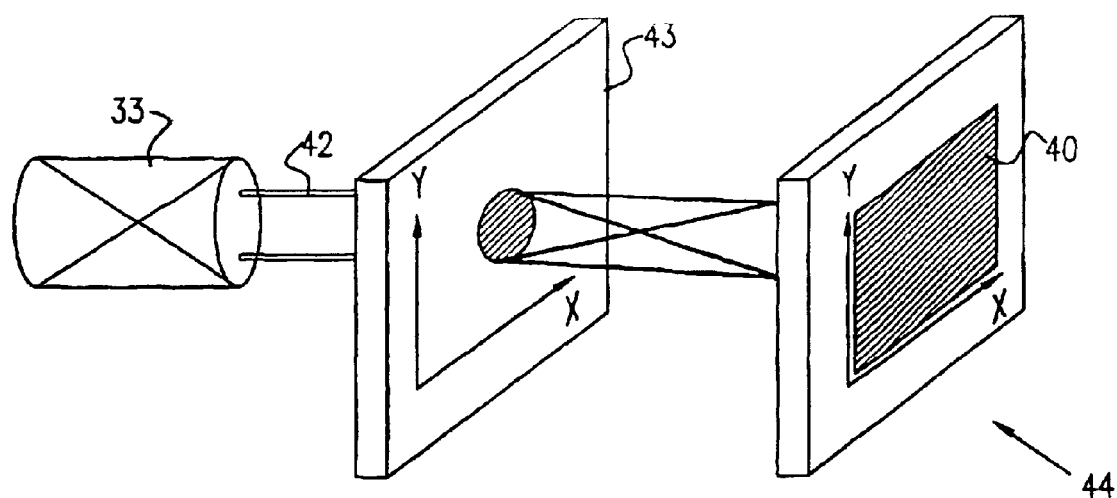
FIG. 5 is a schematic illustration of a system, according to a further preferred embodiment of the present invention, whereby replication of DOE's can be performed without the need for auxiliary focussing or scanning, by means of passing a writing laser beam through a master DOE.

Reference is now made to FIG. 5, which is a schematic illustration of another preferred embodiment of the present invention, wherein repeated samples of a DOE to are produced by means of passing a writing beam 42 produced by a laser 33, through a master DOE 43, to provide the desired image of the desired DOE in the focal plane 44. The master DOE 43 may be calculated and produced according to any of the previous embodiments described hereinabove, or by any other suitable method. In the focal plane, the laser beam is focused so as to produce an assembly of scattering points by means of optical breakdown, such that multiply repeated samples of the desired DOE is obtained. If the laser beam is sufficiently energetic, it can produce several scattering points simultaneously for each incident laser pulse, by differently diffracted beams of the writing laser beam. Although in FIG. 5, only one DOE sample is shown, according to another preferred embodiment of the present invention, it is possible for the writing beam to be diffracted by the master DOE such that it can engrave several DOE samples simultaneously, thereby increasing productivity of the system.

Figure 6:
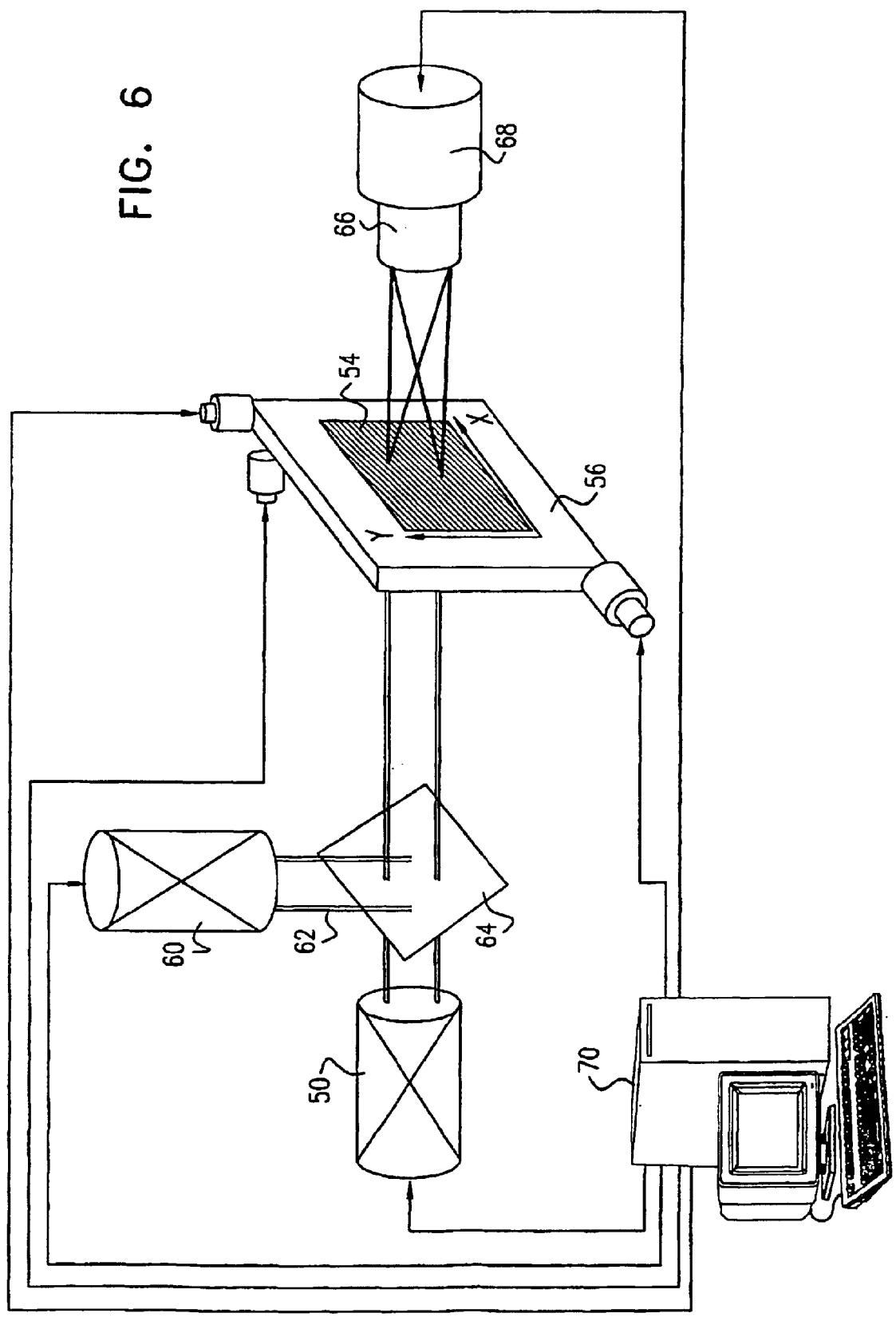
FIG. 6 is a schematic illustration of a system, according to a further preferred embodiment of the present invention, in which the DOE being engraved is dynamically inspected by means of a probe laser beam transmitted through the DOE and imaged thereby, and the laser engraving system adjusted in real time to obtain the desired DOE according to the image obtained.

Reference is now made to FIG. 6, which is a schematic illustration of yet another preferred embodiment of the present invention, whereby active feedback is used to control the properties of a DOE during production in a transparent material by means of optical breakdown. The DOE is dynamically inspected by means of a second probe laser beam transmitted through the DOE and imaged by it, and the laser engraving system adjusted in real time to obtain the desired DOE characteristics according to the resulting image obtained.

The DOE production system is similar to that shown in FIG. 1, and consists of an engraving laser 50, whose beam is focused by means of an objective lens onto the sample 54 in which the DOE is to be engraved. The sample 54 is mounted on a motor driven CNC-controlled motion table 56. For simplicity, no beam scanning system is shown, though it is understood that such a system could also be preferably used for directing the focused laser beam. A probe laser 60 provides a collimated beam 62 which is used as the probe beam for testing the DOE under production 54. The probe laser beam is preferably directed onto the optical axis of the DOE by means of a dichroic beam combiner 64. After being focused by the DOE, the image is recorded by means of a CCD camera 66 mounted on an inspection microscope 68. This CCD camera provides data in real time to the control system 70, about the actual focusing performance of the DOE being produced. The image is compared with the known image expected from the desired DOE performance, and the control system then adjusts the engraving laser and motion system to correct the DOE characteristics to provide the desired DOE performance.

According to a further embodiment of the present invention, a set of scattering centers can be produced for the purpose of amending the optical properties of a material in a predetermined manner. The refraction coefficient or transparency are examples of the properties of the material that can be thus amended.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A method of producing in a solid transparent material, a diffractive optical element for the predefined transformation of an incident wave, comprising the steps of:
   developing a mathematical model of said diffractive optical element in terms of said transformation;
   using said mathematical model for determining a set of points which form said diffractive optical element; and
   focusing at least one pulsed laser beam onto said points, such that it causes optical breakdown damage at said points.

2. The method of claim 1 and wherein said mathematical model reviews the discrete structure of said set of points and takes into account the amplitude and phase properties of their scattering diagram.

3. The method of claim 1 and wherein said determining is performed by finding a numerical solution to the equation $$I, \bar{u}_i, a_i \Rightarrow \min\left\{\sum_{j=1}^{i \leq J} (D(\bar{r}_j) - (G(\{a_i \bar{u}_i\})S)(\bar{r}_j))^2\right\}.$$

4. The method of claim 3 and wherein said numerical solution is found by use of a modified genetic algorithm.

5. The method of equation 1, and wherein said set of points is determined by taking into account twofold or multifold scattering of said scattered wave by said set of points.

6. The method of claim 1, wherein said solid transparent material is a porous material, and also comprising the step of filling said points of said optical breakdown damage with a liquid having a refraction index different from that of said transparent material.

7. The method of claim 1, wherein said set of points lie on a curved two-dimensional surface.

8. The method of claim 1, wherein said set of points comprises a plurality of planes which form a sequential set of diffractive elements.

9. The method of claim 1, wherein said set of points are located in substantially any location in the three dimensional volume of said material.

10. The method of claim 1, wherein said set of points form a binary diffractive optical element.

11. The method of claim 1, wherein said points are located on a fixed grid, have sizes determined from a definite set and form a digital diffractive optical element.

12. The method of claim 11, wherein said sizes are variable and are achieved by varying the number of pulses of said pulsed laser beam used to form each point.

13. The method of claim 1, and wherein said step of developing a mathematical model is performed by analysis of said incident wave.

14. The method of claim 13 and wherein said diffractive optical element is operative to compensate for undesired properties of said incident wave.

15. The method of claim 1, and wherein said step of developing a mathematical model is performed during production of said diffractive optical element, by analysis of said scattered wave.

16. The method of claim 1, and also comprising the step of impinging a monitoring incident wave onto said diffractive optical element during at least part of said step of focusing a pulsed laser beam onto each of said points sequentially, and correcting said diffractive optical element during production in accordance with the scattered wave obtained in real time.

17. A method of correcting an aberration in an optical element by the formation of a diffractive optical element within said element by the method of claim 1.

18. The method of claim 17, and also comprising the step of impinging a monitoring incident wave onto said optical element during at least part of said step of focusing a pulsed laser beam onto each of said points sequentially, and correcting said diffractive optical element during production in accordance with aberrations obtained from said optical element in real time.

19. The method of claim 1, wherein said diffractive optical element is selected from the group consisting of a wave front corrector, a lens, a grating, a beam splitter, a filter and an optical diffuser.

20. The method of claim 1 wherein said diffractive optical element has a predefined reflectance to said incident wave.

21. The method of claim 1 wherein said laser beam is focused onto said points sequentially by mutual motion of said laser beam and said solid transparent material.

22. The method of claim 1 wherein said laser beam is focused onto a plurality of said points simultaneously by transmitting said beam through a master diffractive optical element operative to focus said beam onto said plurality of points.

23. The method of claim 1 wherein said at least one laser beam is a plurality of laser beams, operative to simultaneously produce a plurality of diffractive optical elements.

* * * * *

UNITED STATES PATENT AND TRADEMARK OFFICE
CERTIFICATE OF CORRECTION

PATENT NO.     : 6,884,961 B1
DATED          : April 26, 2005
INVENTOR(S)    : Vladamir Dmitriev et al.

It is certified that error appears in the above-identified patent and that said Letters Patent is hereby corrected as shown below:

Column 6,
Line 39, please change "intavolume" to -- intravolume --.

Column 8,
Line 38, please change "fill" to -- full --.
Line 59, please change "teens" to -- terms --.

Column 10,
Line 9, please change "vet" to -- yet --.

Signed and Sealed this

Sixteenth Day of August, 2005

JON W. DUDAS
*Director of the United States Patent and Trademark Office*